(No Model.)
T. J. HALLECK.
FISHING REEL.
No. 550,883.   Patented Dec. 3, 1895.
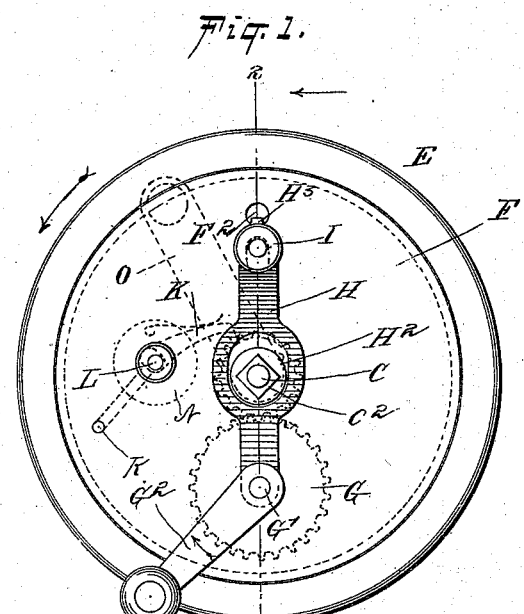
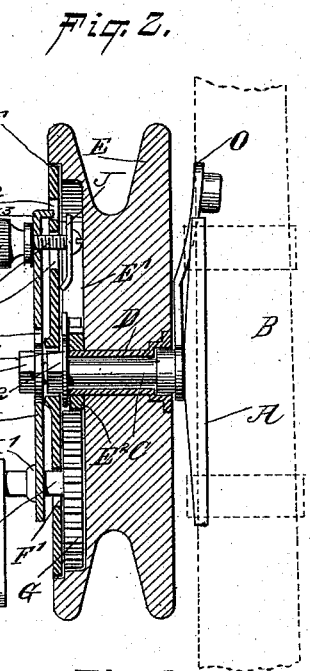
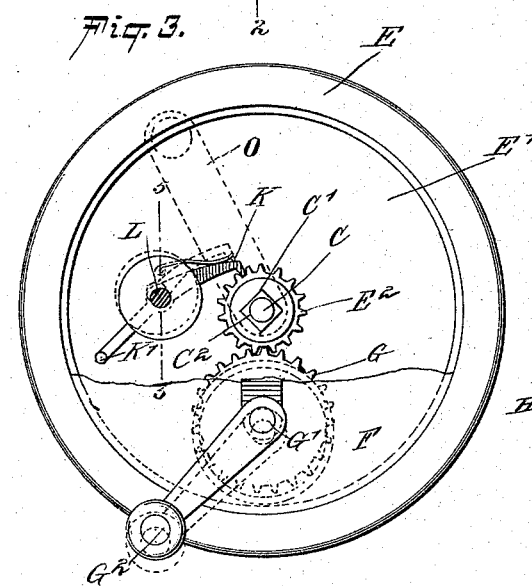
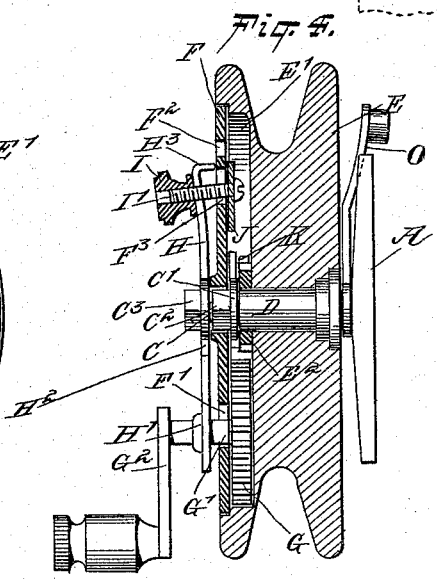
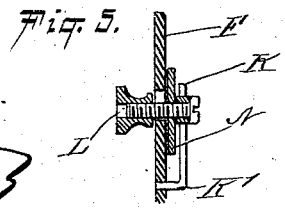
WITNESSES:
William P. Gaebel
Theo. J. Hoster
INVENTOR
T. J. Halleck
BY Munn & Co
ATTORNEYS.

UNITED STATES PATENT OFFICE.

THOMAS J. HALLECK, OF NEW YORK, N. Y.

FISHING-REEL.

SPECIFICATION forming part of Letters Patent No. 550,883, dated December 3, 1895.

Application filed July 18, 1895. Serial No. 556,386. (No model.)

*To all whom it may concern:*

Be it known that I, THOMAS J. HALLECK, of New York city, in the county and State of New York, have invented a new and Improved Fishing-Reel, of which the following is a full, clear, and exact description.

The object of the invention is to provide a new and improved fishing-reel which is simple and durable in construction, very effective in operation, and arranged to enable the operator to quickly throw the gearing in or out of action or retard the revolution of the pulley.

The invention consists principally of a pulley mounted to turn loosely on a fixed pivot and carrying a pinion in its recessed face and a gear-wheel journaled on an arm held adjustable on the cover-plate, fixed on the pivot and serving to close the recess of the pulley.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1 is a face view of the improvement. Fig. 2 is a transverse section of the same on the line 2 2 in Fig. 1. Fig. 3 is a face view of the improvement with parts broken out. Fig. 4 is a transverse section of the improvement with parts in a different position, and Fig. 5 is a cross-section of the retarding-pawl on the line 5 5 of Fig. 3.

The improved fishing-reel is provided with a plate A, adapted to be fastened in the usual manner to a fishing-rod B, as indicated in Fig. 2. From the plate A projects a pivot C, on which is mounted to revolve the metallic hub D of a pulley E, on which the fishing-line is to be reeled. This pulley E is formed in its front face with a recess E', closed by a disk F, held on the forward end of the pivot C, the gearing for driving the said pulley being located in the recess E' in the rear of the disk F.

On the hub D within the recess E' is secured a pinion $E^2$, forming part of the pulley E, the said pinion being adapted to be engaged by a larger gear-wheel G, having its shaft G' extending outwardly through an opening F' in the disk F and mounted to rotate in bearings H', held on an arm H, adjustable on the front face of the disk F. The outer end of the shaft G' is provided with a suitable handle $G^2$ for conveniently turning the said shaft G' in its bearing H' to rotate the gear-wheel G, and when the latter is in mesh with the pinion $E^2$ it revolves the pulley E and reels up the fishing-line. The arm H extends diametrically on the disk F, and is formed at or near its middle with a larger recess $H^2$ for the passage of the outer end of the pivot C.

On the end of the arm H opposite the bearing H' is formed a projection $H^3$, extending inwardly into an opening $F^2$, formed in the disk F. A knob I is held on this end of the arm H and is connected with a spring-disk J by the screw I' for the knob I, the said spring-disk J being located on the back of the disk F, while the screw I' passes through an elongated aperture in the disk F.

Now it will be seen that by the operator pulling on the knob I and lifting the projection $H^3$ out of the opening $F^2$ he can then push the arm H diametrically to move the bearing H' outwardly, so as to carry the gear-wheel G out of mesh with the pinion $E^2$. When, however, the arm H is in the position shown in Fig. 2—that is, with the projection $H^3$ in the opening $F^3$—then the gear-wheel G is in mesh with the pinion $E^2$, and when the operator turns the handle $G^2$ then the pulley E is revolved, as previously explained. The spring-disk J serves to hold the arm H in the forward position shown in Fig. 2, as well as in the out-of-gear position illustrated in Fig. 4.

It is understood that when the gear-wheel G is out of mesh with the pinion $E^2$, then the pulley E is free to rotate loosely on the pivot C to permit the line to unreel quickly for casting or other purposes; but when it is desired to retard the unreeling of the line, then the operator makes use of a pawl K, adapted to be thrown in mesh with the gear-wheel $E^2$, the said pawl being spring-pressed, so as to permit a rotation of the pulley, the pawl only acting as a click or alarm. This pawl K is fastened at K' to the disk F and is arranged on the back of the latter, and on the pawl K is held a clamping-screw L, passing through a slot in the disk F to the front thereof, to permit the operator to swing the pawl K into or out of engagement with the pinion E². A washer N on the clamping-screw L permits of securely fastening the pawl K in either of its two positions. Now it will be seen that by the arrangement described the operator by simply shifting the knob of the clamping-screw L can readily throw the pawl K in engagement with the pinion E² to retard the motion of the pulley E or to throw the said pawl out of engagement and permit a free revolving of the pulley E. The retarding-pawl K, when in mesh with the pinion E², prevents the pulley from rotating and the line from accidentally unwinding; but in case of a bite the pull on the line will rotate the pulley and the pawl will click on the pinion E², thus giving an alarm.

In order to hold the several parts on the pivot C, I place a washer C' on the outer threaded end of the said pivot to abut against the face of the pinion E². Nuts C² and C³ screw on the outer threaded end of the pivot C to hold the said washer in place, the nut C² also forming a support for the plate F, while the nut C³ forms a guide for the slidable arm H.

In the fixed pivot C next to the plate A is held a spring brake-arm O, standing at about right angles to the pole B to enable the operator to press this brake-arm inward against the rear face of the pulley to brake the latter when casting or otherwise required.

Having thus fully described my invention, I claim as new and desire to secure by Letters Patent—

1. A fishing reel, comprising a fixed pivot, a pulley mounted thereon and having a recessed face, a pinion secured on the said pulley in the recessed face, a gear wheel adapted to move in or out of mesh with the said pinion, a cover disk supported on the said pivot, and adapted to cover the recessed face of the pulley, and an arm carrying the shaft for the said gear wheel and held adjustable on the said cover disk, substantially as shown and described.

2. A fishing reel, comprising a fixed pivot, a pulley mounted thereon and having a recessed face, a pinion secured on the said pulley in the recessed face, a gear wheel adapted to move in or out of mesh with the said pinion, a cover disk supported on the said pivot, and adapted to cover the recessed face of the pulley, an arm carrying the shaft for the said gear wheel and held adjustable on the said cover disk, and means for adjusting and fastening the said arm in position on the said disk, as set forth.

3. In a fishing reel, the combination of a plate, a pivot rigid thereon, a reel proper mounted on the pivot and having a recessed face, a disk covering said face, a pinion fixed to the reel proper, an arm movable longitudinally on the pivot, and a spur gear carried by said arm and capable of being moved into engagement with the pinion, substantially as described.

4. In a fishing reel, the combination of a mounted reel proper having a recess in its face, a disk inclosing said recess, an arm movable longitudinally and held outside of the disk, and a gear carried by the arm and capable of engaging to drive the reel proper, substantially as described.

5. In a fishing reel, the combination of a mounted reel proper having a recess in its face, a disk covering said recess and flush with the outer side of the reel proper, said disk having two oppositely arranged slots therein, a longitudinally movable arm held on the pivot of the reel proper, a gear connected to the arm and having its axis passed through one of the slots in the plate, and a projection rigid with the arm and capable of locking with the remaining slot of the disk, substantially as described.

6. In a fishing reel, the combination of a pivot, a reel proper mounted on the pivot, a gear wheel fixed to the reel proper, an arm sliding longitudinally on the pivot, and a gear carried by the arm, substantially as described.

7. In a fishing reel, the combination of a pivot, a reel proper loosely mounted on the pivot, a disk fixed to the pivot, a pawl pivoted on the disk and capable of swinging in and out of engagement with the reel proper, a washer carried by the pawl, and a nut capable of binding the washer against the disk, substantially as described.

THOMAS J. HALLECK.

Witnesses:
WM. F. H. BROCKTON,
WILLIAM LEIMANN.